Patented Sept. 8, 1953

2,651,637

UNITED STATES PATENT OFFICE 2,651,637

1 - BENZYL - 2,3,5,6,7,8 - HEXAHYDROISO-QUINOLONE-3 AND THE PREPARATION THEREOF

Hans Henecka, Wuppertal-Elberfeld, Germany, assignor, by mesne assignments, to Farbenfabriken Bayer Aktiengesellschaft, Leverkusen-Bayerwerk, Germany No Drawing. Application December 9, 1950, Serial No. 200,122. In Switzerland December 12, 1949

8 Claims. (Cl. 260—289)

This invention relates generally to therapeutic agents useful as analgesics, together with processes for making such agents. More particularly, the invention relates to analgesic agents which are closely related, both in chemical constitution and therapeutic activity, to the opium alkaloid, morphine.

It has been found that a chemical compound designated N-methylmorphinane by Grewe et al., Ber. 81, 279–86 (1948) and closely related to morphine in chemical structure, produces analgesic effects and has other therapeutically useful properties almost as powerful as morphine itself.

Various procedures for the synthesis of this compound have been proposed, as outlined in the report of the investigations by Grewe et al. above cited, and in further reports by the same workers, but, in general these methods have had the common disadvantage of requiring organo-metallic compounds as intermediates that could be obtained only with difficulty and by complicated routes of organic synthesis, thus precluding use of these methods in commercial or large scale operations.

For example, it has been suggested to react benzyl magnesium chloride with N-methyl-5,6,7,8-tetrahydroisoquinolinium iodide, which may be prepared by treating 5,6,7,8-tetrahydroisoquinoline with methyl iodide, to produce 2-methyl-1-benzyl-1,2,5,6,7,8-hexahydro-isoquinoline, which may be converted to 2-methyl-1-benzyl-1,2,3,4,5,6,7,8-octahydroisoquinoline by catalytic hydrogenation, then causing this compound to undergo intramolecular rearrangement and cyclization by heating it with about ten times its weight of syrupy orthophosphoric acid at 150° C. for a period of three days, to yield the desired N-methylmorphinane. Another suggested process involves reaction of benzaldehyde with 1-lithium-5,6,7,8-tetrahydroisoquinoline to produce the corresponding carbinol, reducing this carbinol to 1-benzyl-5,6,7,8-tetrahydro-isoquinoline, treating it with methyl iodide to form the corresponding quaternary salt and thereafter reducing this salt and then, by the intramolecular rearrangement and cyclization above mentioned, obtaining the desired N-methyl-morphinane.

One of the chief objects of the present invention is to provide a process for the synthesis of compounds that may be utilized as intermediates in making N-methyl-morphinane and kindred substances, having the advantage over previously known methods of not requiring expensive or difficultly prepared raw materials or other intermediates.

It is also an object of this invention to provide a method for synthesis of compounds of the type mentioned which will readily permit preparation of closely related alkoxy, especially methoxy, substituted compounds by the mere selection of a suitably substituted initial reactant.

Regarded in certain of its broader aspects, the novel process of this invention may be represented as follows:

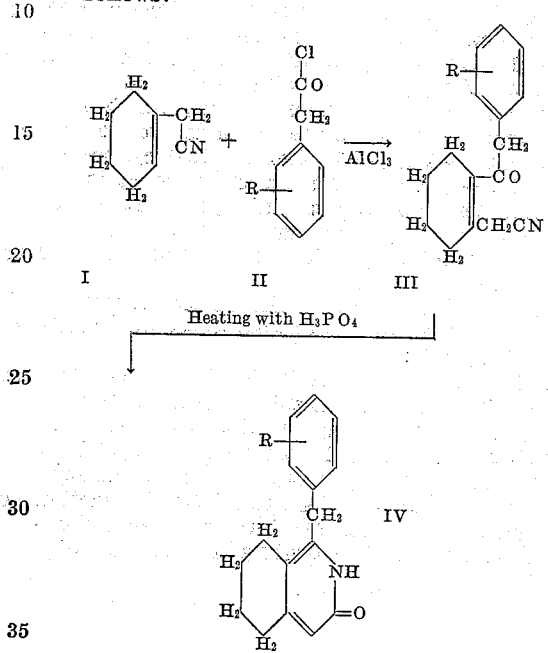

wherein R is at least one substituent of the group consisting of hydrogen and alkoxy.

Stated in more specific terms, the process of this invention comprises condensing $\Delta^{1,2}$-cyclohexenyl-acetonitrile with a α-toluyl chloride, which may have one or more nuclear alkoxy substituents, at a low temperature in an organic solvent medium and in the presence of a Friedel-Crafts reaction catalyst, to produce $\Delta^{1,2}$-2-(α-toluyl)-cyclohexenyl acetonitrile, then heating this reaction product with syrupy orthophosphoric acid on a water bath for a period of at most one hour whereby intramolecular rearrangement occurs to produce 1-benzyl-2,3,5,6,7,8-hexahydroisoquinolone-3. The preferred catalyst for use in the initial reaction is anhydrous aluminium chloride and carbon disulfide is a satisfactory organic solvent medium.

To illustrate an application of the principles of this invention, a typical process will now be described as an example, with the understanding that, by use of suitable alkoxy substituted initial reactants, compounds useful in the synthesis of alkoxy substituted N-methyl-morphinanes may be obtained.

Example

A mixture of about 77.5 grams of α-toluyl-chloride and 60.5 grams of $\Delta^{1,2}$-cyclohexenyl-acetonitrile is added, dropwise, to a mixture of 135 grams of aluminum chloride and 500 cc. of carbon disulfide, maintained at approximately $-15°$ C. over a period of 6 to 7 hours. After standing for 12 hours at room temperature with occasional stirring, the mixture is poured onto ice, the carbon disulfide is separated, washed with water until it is substantially neutral, then evaporated to yield a residue which is purified by fractional distillation. The $\Delta^{1,2}$-2-(α-toluyl)-cyclohexenyl-acetonitrile thus obtained is a yellow, viscous oil boiling at 173° C. at 0.4 mm. pressure.

By treating this $\Delta^{1,2}$-2-(α-toluyl)-cyclohexenyl acetonitrile on a water-bath with the three to four times its weight of syrupy phosphoric acid for ½ to ¾ hour, 1-benzyl-2,3,5,6,7,8-hexahydroisoquinolone-3 is obtained as a finely crystalline precipitate. After recrystallizing from methanol, this product is obtained as fine, small crystals melting at 245° C. This compound may also be obtained by condensing a phenylacetic acid ester with cyclohexanone to obtain 2-(α-toluyl)-cyclohexanone, which may be reacted with cyanacetamide to obtain 1-benzyl-2,3,5,6,7,8-hexahydro-4-cyano-isoquinolone-3, and converting this product to the desired compound by careful hydrolysis, as described in the present inventor's concurrently filed copending application, Serial Number 200,121.

Having thus described the subject matter of this invention, what is desired to secure by Letters Patent is:

1. Process for the synthesis of chemical compounds useful as intermediates in the manufacture of therapeutic agents that comprise condensing an α-toluyl halide with $\Delta^{1,2}$-cyclohexenyl-acetonitrile in an organic solvent medium and in the presence of a Friedel-Crafts reaction catalyst, to produce $\Delta^{1,2}$-2-(α-toluyl)-cyclohexenyl acetonitrile, and heating this product with phosphoric acid to use intramolecular rearrangement and formation of 1-benzyl-2,3,5,6,7,8-hexahydroisoquinolone-3, and recovering this product from the mixture.

2. The process as defined in claim 1 wherein the catalyst is aluminum chloride.

3. The process as defined in claim 2 wherein the organic solvent medium is carbon disulfide.

4. The process as defined in claim 3 wherein the α-toluyl halide is α-toluyl chloride.

5. A process for the synthesis of chemical compounds useful as intermediates in the manufacture of therapeutic agents, comprising a step that comprises condensing an α-toluyl halide with $\Delta^{1,2}$-cyclohexenyl-acetonitrile in an organic solvent medium in the presence of a Friedel-Crafts reaction catalyst to produce a $\Delta^{1,2}$-2-(α-toluyl)-cyclohexenyl-acetonitrile.

6. A process for the synthesis of chemical compounds useful as intermediates in the manufacture of therapeutic agents, comprising a step that comprises heating $\Delta^{1,2}$-2-(α-toluyl)-cyclohexenyl-acetonitrile with phosphoric acid to cause intramolecular rearrangement and formation of 1-benzyl-2,3,5,6,7,8-hexahydroisoquinolone-3, and recovering this product from the mixture.

7. An intermediate useful in the synthesis of chemical compounds that comprises the substance $\Delta^{1,2}$-2-(α-toluyl)-cyclohexenyl-acetonitrile.

8. An intermediate useful in the synthesis of chemical compounds that comprises the substance 1-benzyl-2,3,5,6,7,8-hexahydroisoquinolone-3.

HANS HENECKA.

References Cited in the file of this patent

UNITED STATES PATENTS

| Number | Name | Date |
|---|---|---|
| 2,554,842 | Schnider et al. | May 29, 1951 |

FOREIGN PATENTS

| Number | Country | Date |
|---|---|---|
| 253,710 | Switzerland | Dec. 1, 1948 |

OTHER REFERENCES

Basu et al.: Annalen, vol. 516, pp. 243-248 (1935).

Grewe et al.: Berichte, vol. 81, pp. 279-286 (1948).